United States Patent

Negishi

[15] 3,665,407

[45] May 23, 1972

[54] AN AUTOMATIC PROCESSING SYSTEM FOR BOWLING GAMES

[72] Inventor: Satoshi Negishi, Yokohama, Japan

[73] Assignee: Tokyo Shibaura Electric Co., Ltd., Kawasaki-shi, Japan

[22] Filed: May 25, 1970

[21] Appl. No.: 40,089

[30] Foreign Application Priority Data

May 23, 1969 Japan ....................................44/39544

[52] U.S. Cl. ....................................340/172.5

[51] Int. Cl. ....................................G06f 3/06

[58] Field of Search ..............235/61.7, 61.9; 340/149, 172.5

[56] References Cited

UNITED STATES PATENTS

| | | | |
|---|---|---|---|
| 3,505,646 | 4/1970 | Affel, Jr. et al. | 340/172.5 |
| 3,487,905 | 1/1970 | James, Sr. | 235/61.9 X |
| 3,308,439 | 3/1967 | Tink et al. | 340/172.5 |
| 3,516,068 | 6/1970 | Howard et al. | 340/172.5 |
| 3,428,959 | 2/1969 | Acker | 340/172.5 |
| 3,335,407 | 8/1967 | Lange et al. | 340/172.5 |
| 3,253,125 | 6/1966 | Jorgensen et al. | 235/61.9 |

*Primary Examiner*—Paul J. Henon
*Assistant Examiner*—Sydney R. Chirlin
*Attorney*—Flynn and Frishauf

[57] ABSTRACT

A processing system for bowling games which receives information carriers carrying prior bowling information for each participant. Progressing current bowling information is received and processed and a new information carrier carrying new updated information is produced after it is ascertained that the old information carrier is confiscated to prevent repeated use thereof.

3 Claims, 15 Drawing Figures

FIG. 3A
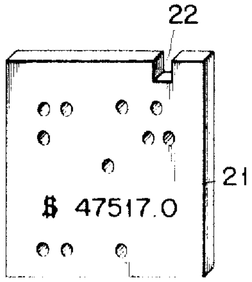
FIG. 3B
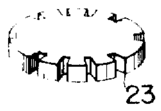
FIG. 3C
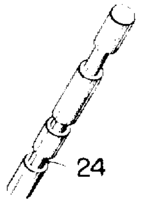
FIG. 4
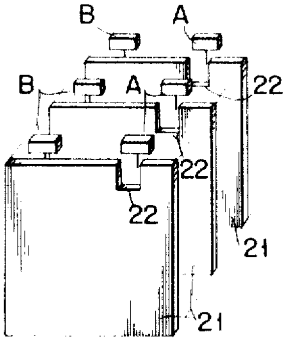
FIG. 5
CARD LOADING CONDITION
| RELAY | CORRECT | ERROR | NO CARD |
|---|---|---|---|
| RELAY [A] | OFF | ON | OFF |
| RELAY [B] | ON | OFF | OFF |
| CODE A.B | 01 | 10 | 00 |
| CODE A.B | 11 | 01 | 10 |
FIG. 7
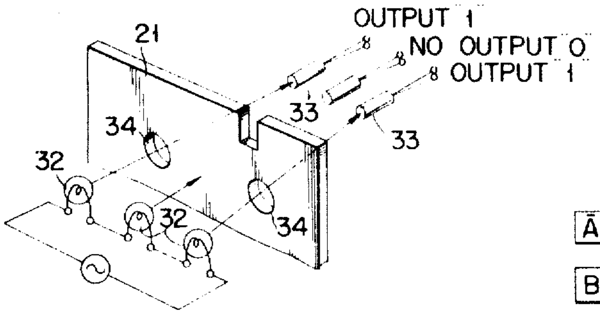
FIG. 6
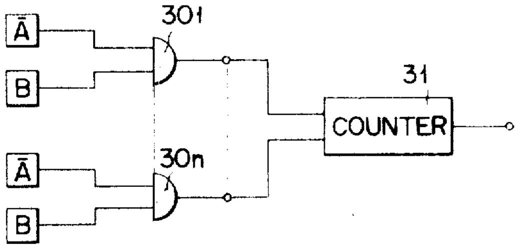

AN AUTOMATIC PROCESSING SYSTEM FOR BOWLING GAMES

BACKGROUND OF THE INVENTION

This invention relates to automatic processing systems for bowling games.

In the art of information processing, there if frequently required an input-output unit (hereinafter termed I/O unit) for simultaneously processing information regarding a multitude of users in a group.

By way of example, in a bowling alley the number of toppled pins has heretofore been counted and recorded on a recording paper by individual bowlers. Thus, there is a need for a device to electrically or mechanically detect the number of toppled pins and automatically process the result through a processor to compute the score. Such a device is desirably capable of processing the record of the past games and the result of the latest games through a processor by loading information carriers carrying information such as the past record for an individual player into the device to produce resultant records, recording the produced records on respective new information carriers and issuing the new information carriers.

SUMMARY OF THE INVENTION

An object of the invention is to provide an automatic processing system for bowling games having an input-output unit for processing received information from an information carrier peculiar to each of a plurality of users, and information from a separate information source to produce new information, recording the new information on a new information carrier to be issued while confiscating the old information carrier.

According to the invention, an input-output unit for information processing is provided, comprising a means capable of simultaneously receiving and reading information out of one or more information carriers individually peculiar to respective users, a means to supply read-out information to a processor, a means to disable the re-use of the information carriers fed to the information receiving means after the information has been processed through the processor, a means to feed the result of the information processing by the processor to a recording means, and a means to issue new information carriers after completion of recording of the processed result on the new information carriers by the recording means and after disabling the re-use of the old information carriers.

BRIEF DESCRIPTION OF THE DRAWINGS

FIGS. 3A, 3B and 3C show other examples of the information carrier;

FIG. 4 is a schematic perspective view of means to check whether the information carrier is normally loaded into the I/O unit;

FIG. 5 is a chart showing various combinations of on-off states of relays of FIG. 4;

FIG. 6 is a schematic diagram showing an example of means to detect the number of information carriers loaded in the I/O unit;

FIG. 7 shows, partly in schematic and partly in perspective, an arrangement for detecting information from information carrier embodying the invention;

DESCRIPTION OF THE PREFERRED EMBODIMENT

Figures 1, 2A, 2B:
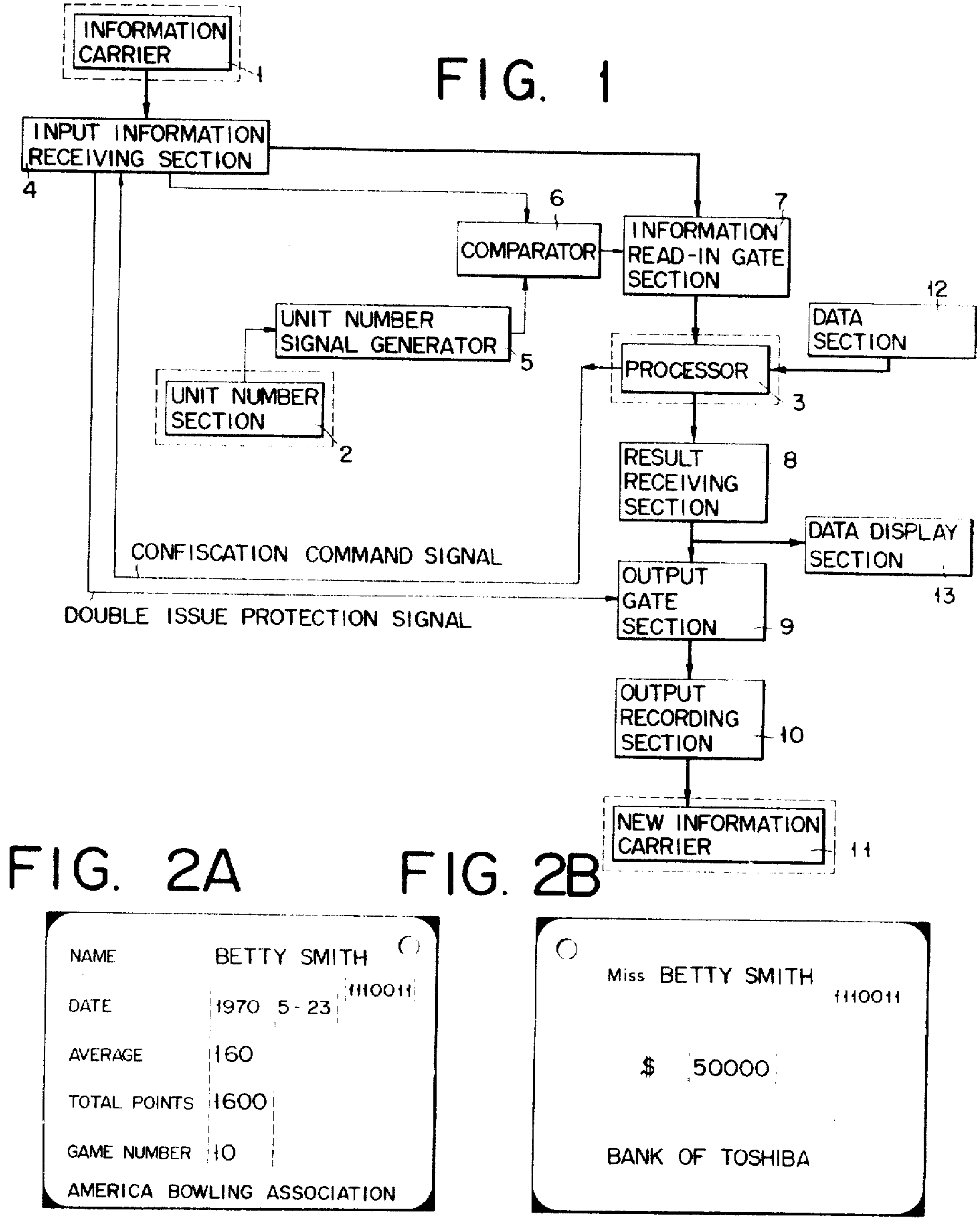
FIG. 1 is a block diagram outlining an embodiment of the input-output unit according to the invention.
FIG. 2A shows an example of the information carrier to be used in a bowling alley.
FIG. 2B shows an example of the information carrier to be used in a bank.

FIG. 1 is a block diagram of the I/O unit according to the invention. In the figure, the flow of input and output information is indicated by bold lines. Other parts than the I/O unit, such as information carriers 1 and 11, unit number section 2 and processor 3, are enclosed within dashed lines.

Information carrier 1 carries information peculiar to one of a plurality of users of the unit recorder in accordance with a predetermined formula. Information recorded on one information carrier constitutes one unit of information.

Information carrier 1 is loaded into an input information receiving section 4, and the information is read out. The read-out information is fed to a processor 3.

The number of information units is specified in accordance with the number of information carriers to be loaded into the I/O unit. The input information fed to the section 4 is transferred to the processor 3 only when intelligence of a unit number signal generated by a unit number signal generator 5, controlled by a unit number section 2, coincides with the number of information units equal to the number of loaded information carriers. The coincidence of the unit number signal from the unit number signal generator 5, with that from the input information receiving section 4, is detected by a comparator 6, whereupon the output gate signal from the comparator 6 opens the gate of an information read-in gate section 7 to permit the input information detected by the input information receiving section 4 to feed the processor 3, which also receives information from a data section 12, a separate information source, and information from both sources is processed to produce new information, which is fed to a result receiving section 8 to be eventually recorded on the new information carrier 11 to be issued to the user.

Before the issuance of the new information carrier 11, a measure is required to prevent double issue of both the old and now information carriers 1 and 11 in order that the old information carrier 1, which has given input information to the I/O unit, is no longer usable as a carrier to provide similar input information. To this end, after the new information obtained in processor 3 by processing information from input information receiving section 4 and information from data section 12 is applied to the result receiving section 8, a confiscation command signal is applied from the processor to input information receiving section 4 to confiscate old information carrier 1. Subsequently, the input information receiving section 4 generates a double issue protection signal (hereinafter termed DIP signal) to open an output gate section 9, whereupon the information stored in the result receiving section 8 is supplied to an output recording section 10, where the new information is recorded on the new information carrier 11.

The content of the result receiving section 8 may be successively displayed on a data display section 13.

The functions of various elements of the system of FIG. 1 will now be described in the case where the I/O unit according to the invention is used in bowling and banking.

In case of bowling use, information such as name, code number, date, past average and total points, game numbers, etc. is recorded on an information carrier at predetermined places and according to a predetermined formula, as shown in FIG. 2A. In FIG. 2A, the records within dashed lines are made in magnetic ink to be recognized by sight.

The method for recording information in the above manner and the method for electrically reading out characters and figures recorded in this manner are well known in the art, so their detailed description is omitted.

When the game is played, for instance, by 4 members, an equal number of information carriers for the respective members are loaded into the input information receiving section 4. When, for instance, a caretaker of the bowling alley pushes a specified unit number key (key for unit number "4" in this case) in the keyboard, which is the unit number section 2 and may be installed on a counter, the unit number signal generator 5 generates a binary-coded decimal signal corresponding to the number "4." When this signal coincides with a binary-coded decimal signal from the input information receiving section 4 indicating that the unit number of information is "4," the comparator 6 generates an output gate signal to open the gate of the information read-in gate section 7, thus transferring the information to the processor 3.

The data section 12 detects data such as the number of toppled pins, spares and strikes through an electrical detection means installed in the bowling alley and feeds the detected data to the processor 3. It also feeds such information as the order of ball delivery and the handicap for each member if necessary, given by the individual member before the game.

Processor 3, which has an operation program in accordance with bowling rule, calculates the score, including strikes and spares, for each member and processes information about the past records and information about the result of the latest games, thereby producing resultant information about the average, total score, game numbers and so forth for each member to be recorded on new information carriers.

Data display section 13 automatically displays the score of the game in progress on a cathode-ray tube in a manner similar to recording the score on a paper sheet, so that the bowlers can observe the scores while playing.

After the end of the game, when the member pushes, for instance, a game end button, the processor starts to process the record of the past games and the result of the latest games. At the same time, an old information carrier confiscation signal is sent to input information receiving section 4, and with the DIP signal produced after the confiscation of the old information carrier the gate of the output gate section 9 is opened to permit information about the record of each player to be supplied from the result receiving section 8 to the output recording section 10. The transferred information is recorded on new information carriers, which are then issued to the respective member.

Where a plurality of bowling alleys each equipped with an I/O unit are collectively provided with a common central processing device, there may be issued to the bowlers an information carrier allowed for common use to the bowling alleys. In such case, it is possible to file average data on games in the central processing device at the end of games and play them next time by adding the handicaps computed from all the past data. Further, to make bowling more amusing, there may be provided a program to indicate the rank of each bowler per frame on the basis of the data furnished by the central processing device.

In case of banking use, such information as depositor's name, code number, amount deposited and so forth is recorded in magnetic ink in the information carrier, as shown in FIG. 2B. When such information carrier is loaded into the input receiving section 4 of the I/O unit, the code number detected is transmitted to the data section and the amount deposited by the user is detected from the depositor's file recorded in the central memory of the bank and the resultant signal is transferred to the processor 3. Part of the data section 12 is installed at the bank counter, so that the users can specify the amount of drawal, deposit, transfer and so forth. The processor 3 checks whether the amount recorded on the loaded information carrier is equal to the amount recorded on the bank side and adds the specified deposit account or subtracts the specified withdrawal data.

The data display section 13 in this case displays the checked state of the information carrier to the benefit of the bank. Thus, if the loaded information carrier, for instance, has been lost by the proper owner, the fact can be detected from the bank's file for the display. When the loaded information carrier is checked and found to be valid, the arithmetic operation is carried out by the processor 3. After the operation, the confiscation demand signal is applied to the input information receiving section to confiscate the old information 4 carrier 1. On the basis of the confiscating action the DIP signal is applied to the output gate section 9, thus transferring the result of the arithmetic operation to the output recording section 10, where new information such as balance together with the depositor's name and code number is recorded on a new information carrier 11, which is issued to the waiting user.

The I/O unit may be constructed in the same manner as described above, where it is also put to a similar application to the banking use, that is, where customers of a particular shop are each furnished with a specified credit card and there are deducted from the credit registered on the card the amounts of purchased goods.

The important parts in the system of FIG. 1 will now be described one by one in further detail.

The information carrier 1 or 11 is desirably small in size, light in weight, strong and inexpensive to facilitate storage, carrying and handling. It is suitably made of such material as paper, plastics and metal. Various types configurations of the information carrier may be such as, for instance, a card carrying information recorded in magnetic ink as shown in FIGS. 2A and 2B, a card carrying punched information as shown in FIG. 3A, a medallion carrying information recorded in peripheral grooves 23 as shown in FIG. 3B, and a rod carrying information recorded in annular peripheral grooves 24 or magnetization as shown in FIG. 3C.

By way of example, the card information carrier of FIG. 3A will now be described in detail.

Card 21 has dimensions of, for instance, 3 cm × 5 cm × 0.5 cm and is preferably made of a polycarbonate material. Information constituting one unit content is recorded at a prespecified position in terms of punched holes, for instance, 0.5 cm in diameter, in accordance with predetermined codes. In the information content, such information as user's name, deposit amount and game record to be recognized by the sight of the user is preferably printed with characters and figures on the card face in addition to the recording by the punched-hole means.

To prevent the card 21 from being loaded in a wrong orientation into the I/O unit, an indentation or notch 22 may be formed in the card as shown in FIG. 3A. To this end, the information carriers shown in FIGS. 2A and 2B may be formed with a hole at a corner, those of the medallion type, as shown in FIG. 3B, may be formed with, for instance, a projection on one side, and those of the rod type, as shown in FIG. 3C, may have different upper and lower diameters.

FIG. 4 shows an example of a loaded card checking means for detecting the number of the information carrier cards as well as checking whether cards are correctly loaded. The detection is made through a pair of microrelays A and B cooperating with the notch 22 of the loaded card. When the card is correctly loaded, the notch 22 and one of the relays, namely relay A, come into correct mutual positions to open the relay A. The other relay B is, on the other hand, closed, When the card is incorrectly loaded or fails to be loaded, unusual combinations of the on-off states of the microrelays A and B result as described hereinafter, to enable discrimination of three different cases. There are three different combinations of the on-off states of the microrelays A and B, as shown in FIG. 5. The "off" and "on" states of the relay switch are corresponded to respective logic outputs "0" and "1".

Accordingly, as shown in FIG. 6, only when the card is correctly loaded, the microrelays A and B apply the respective negative and positive outputs $\bar{A}$ and B to one of a plurality of parallel AND gates $30_1, 30_2 \ldots 30_n$ corresponding in number to the maximum number n of information carriers capable of loading at one time. The outputs of these AND gates are counted by a counter 31 to detect the number of information units properly loaded in the I/O unit.

As is described, it is possible to electrically detect the number of information units through the use of microrelays. The detection of the unit number is possible not only with the above electrical means but also with a suitable mechanical means.

FIG. 7 shows an example of an information detector to detect information out of the information carrier 21 loaded into the input information receiving section. The punched card 21 is inserted between a row of light sources 32 individually corresponding to respective information bits occupying predetermined positions on the card and an opposing row of photoelectric converting elements 33. When a hole is punched at the bit 34, light from a corresponding light source 32 reaches the associated photoelectric converting element 33. Thus, information on the card may be converted into a corresponding digital signal. Light source 32 may be, for instance, an incandescent light, homogeneous light, luminescent diode, laser light and so forth. Further, a plane light source such as EL (ElectroLuminescence) may be used instead of a plurality of spot light sources aforementioned.

Figure 8A:
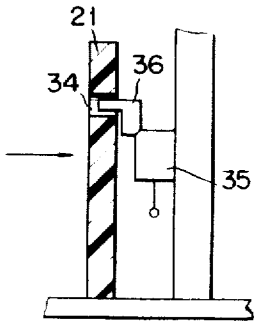
FIGS. 8A and 8B show another information detecting arrangement embodying the invention.
Figure 8B:
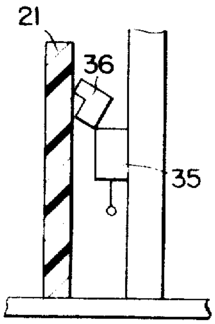

The information thus converted into the electric signal is fed through the information read-in gate section 7 to processor 3. FIGS. 8A and 8B show another example of the information detecting means. In this example, the function of the light source and photoelectric converting element in the previous example is replaced with the action of a mechanical probe 36 of an associated microrelay 35 to detect whether the punched hole is present or absent for converting information into electric signals. The arrow indicates the direction in which the card is moved against the probe. It is also possible to use a pressure-sensitive element such as a pressure-sensitive diode in place of the microrelay.

To disable the repeated use of the information carrier, it is preferable to confiscate it. Confiscated old information carriers can be a stored data source which is often necessary for updating processing on the master file. Alternatively, it is possible to record a signal indicating that the information carrier is invalid on the information carrier. This, however, requires a means for detecting whether the information carrier is invalid or not, to add to the complication of the construction of the systems.

Figure 9:
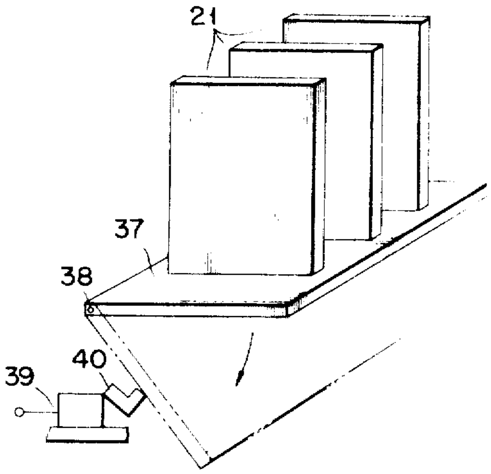
FIG. 9 is a fragmentary perspective view, partly in schematic, showing an example of means to confiscate old information carriers.

FIG. 9 shows an example of a means to confiscate the loaded card. It comprises a card support member 37 rotatable about an axis 38. When the confiscation demand signal is produced, a suitable electromechanical means to lock the support member 37 is released to rotate the support member, thus dropping the cards into a container to confiscate the cards.

The DIP signal is produced when the rotation of the support member 37 is detected by a probe 40 of a microrelay 39 disposed beneath the support member 37.

The unit number signal generator 5 generates a unit number signal to be compared with the number of information units by the comparator 6, which unit number signal corresponds to the number of information units that the I/O unit should process simultaneously and is specified by the superintendent of the unit when he gives the permission for respective users to use the unit. It may be an ordinal binary-coded decimal code generator, and it is controlled by a keyboard constituting the unit number section operated by the superintendent.

Figure 10:
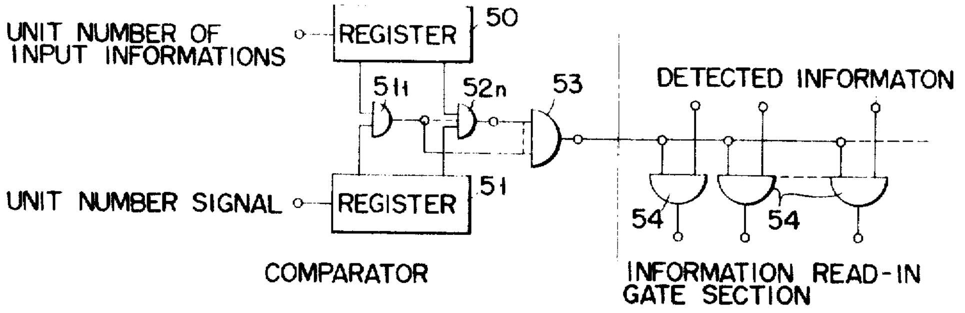
FIG. 10 shows, partly in block form and partly in schematic form, an example of the control circuit for supplying information to an information processor.

The comparator 6 comprises a register 50 to memorize the unit number of input information units and a register 51 to receive and store the unit number signal, as shown in FIG. 10. The states of the corresponding bits of the two registers are compared with each other, and when all the bits of one register are in the same state as that of the corresponding bits of the other register, the unit number is judged to be identical with the specified unit number. Accordingly, corresponding two bit outputs from both registers are applied to the respective two input terminals of each of gate circuits $52_1 \ldots 52_m$, whose outputs are all applied to a multi-input gate circuit 53 having m input terminals.

When the input information unit number coincides with the specified unit number, the multi-input gate circuit 53 applies output "1" to one of the two input terminals of each of two-input gate circuits 54. The other input terminal of each of the gate circuits 54 receives output from, for instance, a corresponding photoelectric converting element of the aforementioned information detector. Thus, when the coincidence output is present, the detected information is transferred through the gate circuits 54 of the information read-in gate section 7 to the processor 3.

The result receiving section 8 receives the processed result from the processor, and it may be a well-known circuit, for instance, using flip-flops.

The output gate section 9 functions to permit the content stored in the result receiving section 8 to the output recording section 10 upon receiving the DIP signal produced on the basis of the confiscating action of the old information carriers. It may comprise gate circuits similar to the previous gate circuits.

Figure 11:
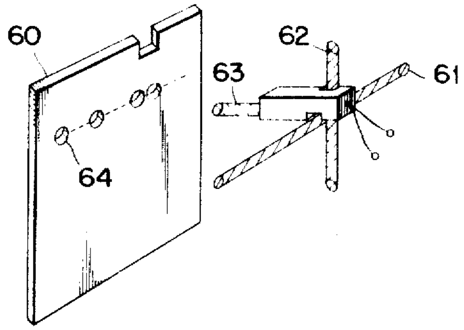
FIG. 11 is a schematic perspective view of an example of a means to record information on new information carriers.

The output recording section 10 may comprise, for instance, a drill 63 driven by the information from the processor along vertical and horizontal guides 61 and 62 to form holes 64 constituting new information in a new information carrier 60 held at a predetermined position, as shown in FIG. 11.

Though the means to issue the new information carrier is not illustrated, the issuance of the new information carrier may be usually accomplished, for instance, by electronically locking a take-out cover provided to the output recording section and automatically releasing the take-out cover after the new information is recorded on the new information carrier in the output recording section, so that the new information carrier may be freely taken out. The releasing of the locked take-out cover may be indicated by a suitable display means.

As has been described in the foregoing, the I/O unit according to the invention requires no particular operator and is able to receive information from a plurality of simultaneous users and give processed results recorded on individual new information carriers directly to these users. As the unit requires no particular operator and may be used extremely easily and simultaneously by a plurality of persons, it is possible to automatize various information processing which has heretofore required special workers or operators.

What is claimed is:

1. An automatic processing system for bowling games comprising:

means for receiving and reading bowling information from at least one information carrier, each carrier being individually peculiar to respective bowlers;

a processor for processing bowling data;

means for supplying the bowling information read out by said bowling information reading means to said processor;

means for supplying currently progressing bowling data of the respective bowlers to said precessor;

means for disabling, to prevent the re-use of, the respective information carriers fed to said input information receiving means after said bowling information from said information carriers and said currently processing bowling data have been received and processed by said processor, and for generating a protection signal indicating that said information carriers have been disabled;

means coupled to said processor for recording results processed by said processor on new information carriers;

means coupled to said recording means and to said disabling means for issuing said new information carriers after the recording of said results on said new information carriers is completed, and after receipt of said protection signal from said disabling means to prevent re-use of said first mentioned information carriers.

2. An automatic processing system for bowling games according to claim 1 further comprising means for detecting the number of bowling information carriers received by said input information receiving means to generate a bowling information carrier number signal; means for generating a unit number signal to specify the number of participants in said bowling game; means for comparing said bowling information carrier number signal from said detecting means with said specified unit number signal from said generating means; and for generating a coincidence signal when said signals coincide; and transfer means responsive to said coincidence signal from said comparing means for transferring said bowling information readrout by said input information receiving means to said processor.

3. An automatic processing system for bowling games according to claim 1 further comprising display means for visually displaying the results processed by said processor.

* * * * *